May 7, 1935. G. McD. JOHNS 2,000,519
COIN SELECTOR
Filed Jan. 19, 1931  9 Sheets-Sheet 1
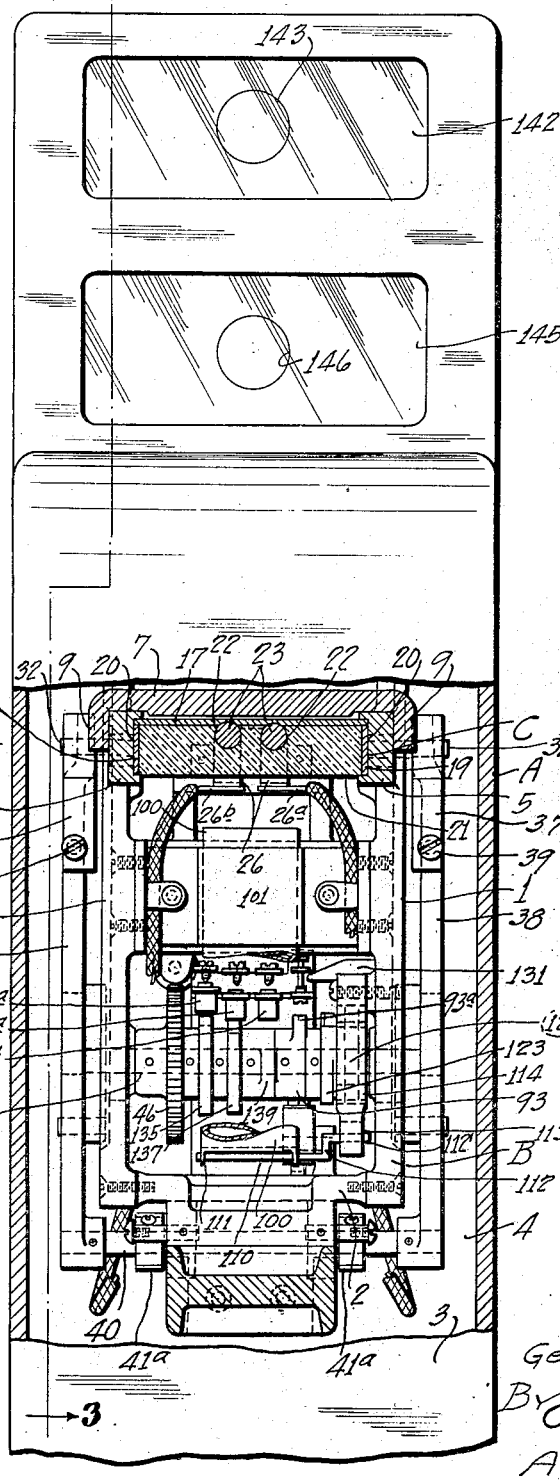
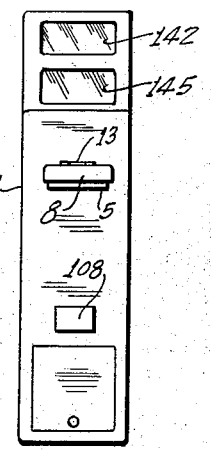
INVENTOR
George McD Johns.
BY
ATTORNEY

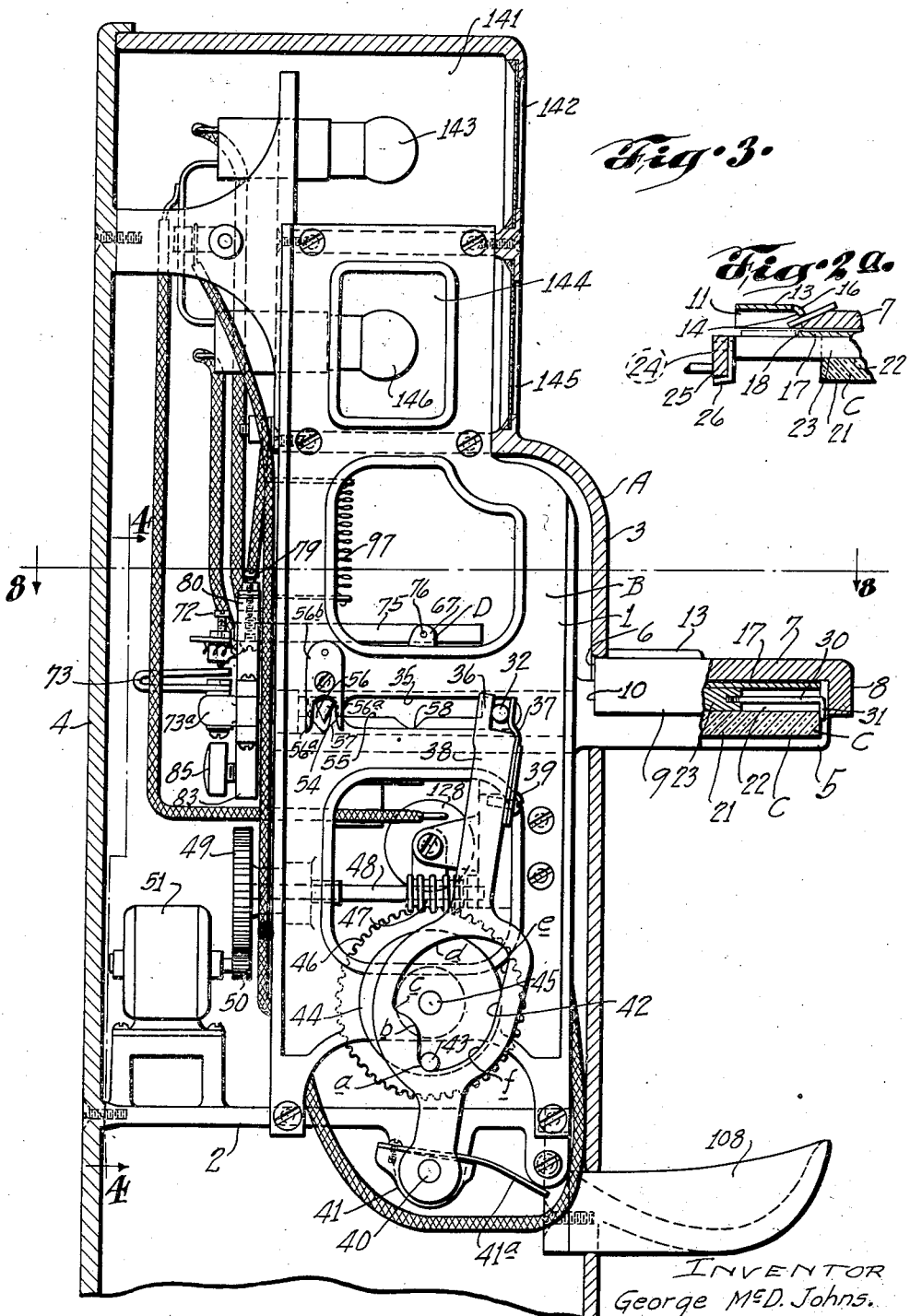

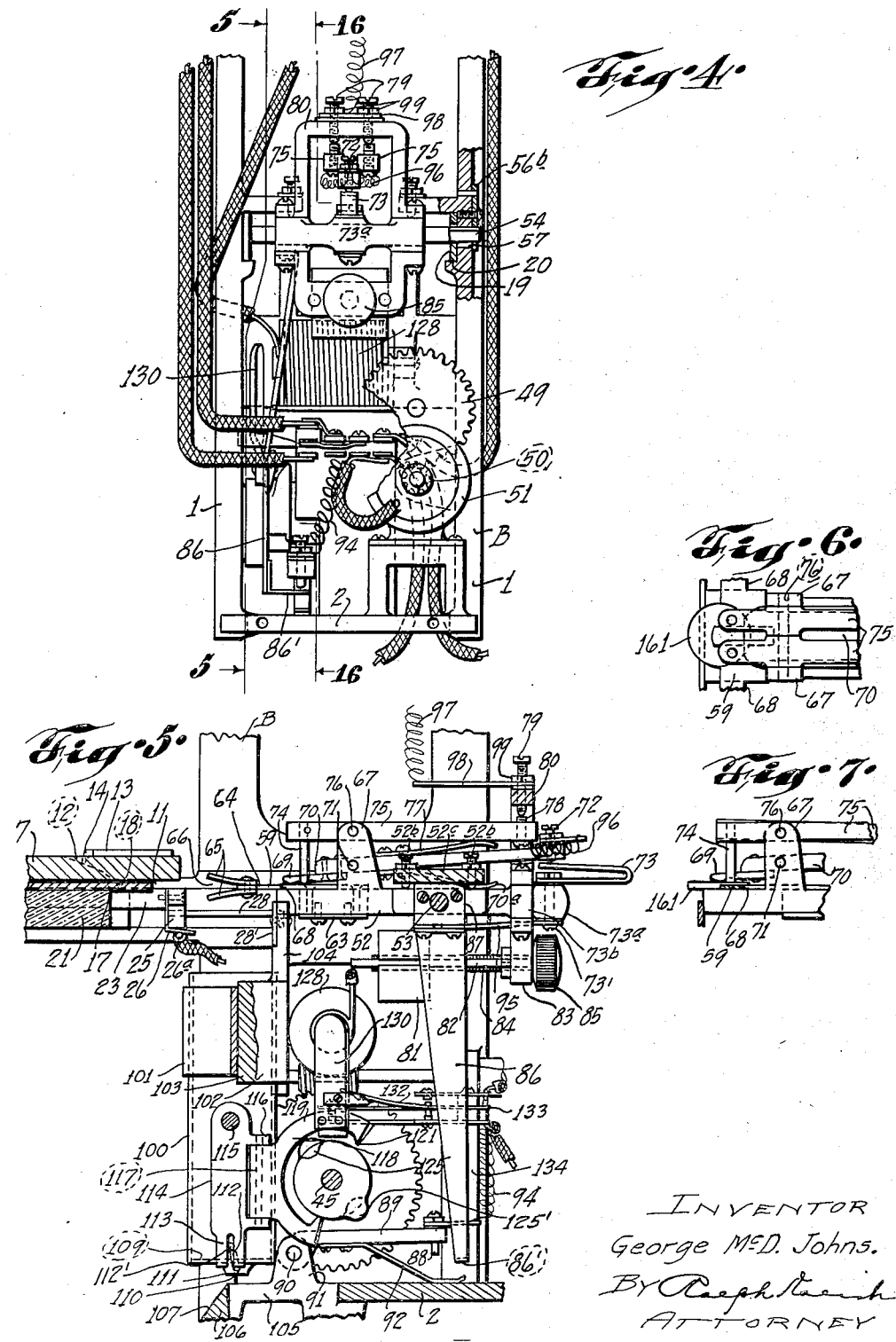

May 7, 1935. G. McD. JOHNS 2,000,519
COIN SELECTOR
Filed Jan. 19, 1931 9 Sheets-Sheet 4

INVENTOR
George McD. Johns.
By Ralph Klein
ATTORNEY

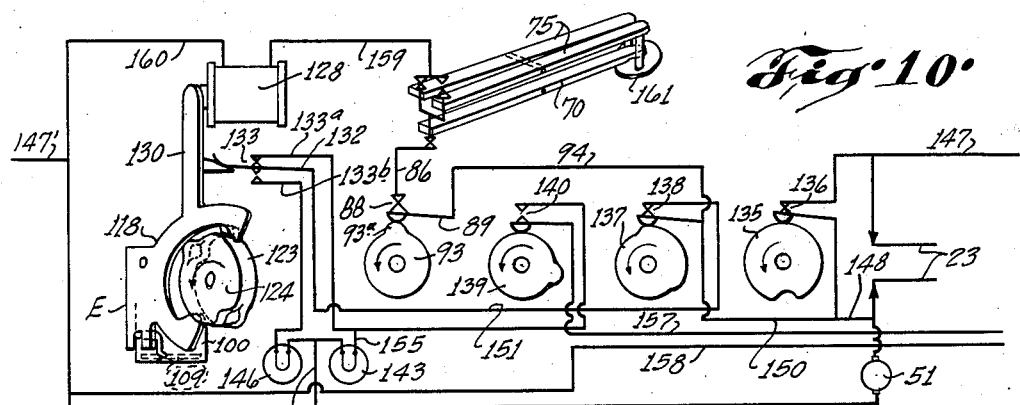
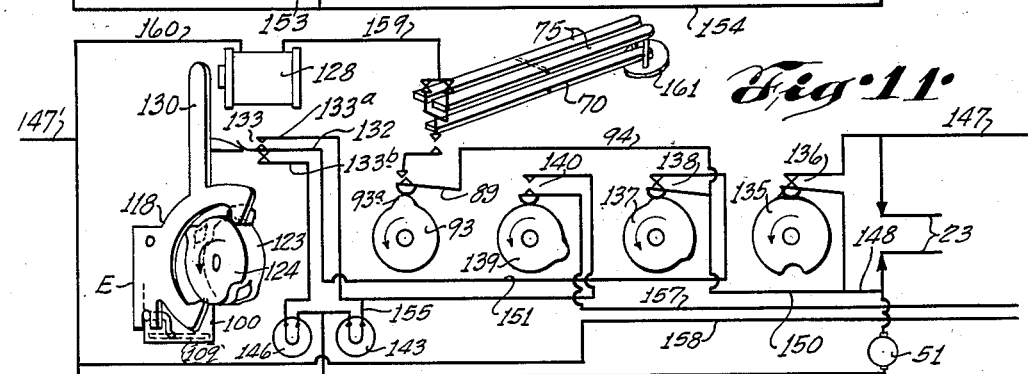
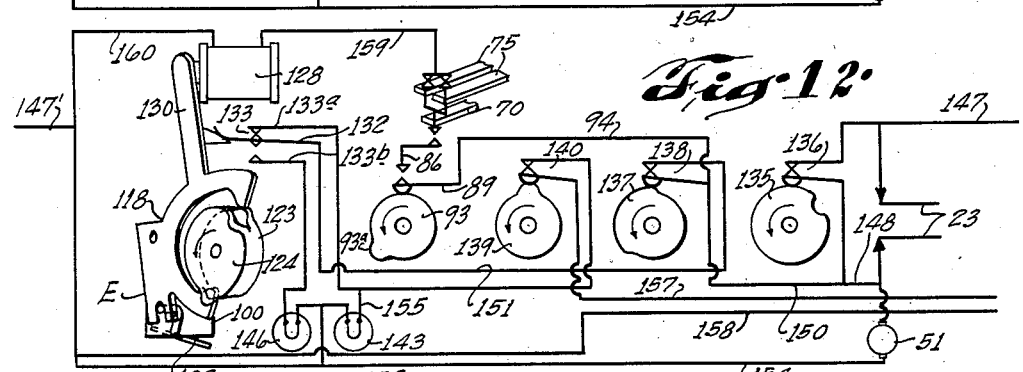
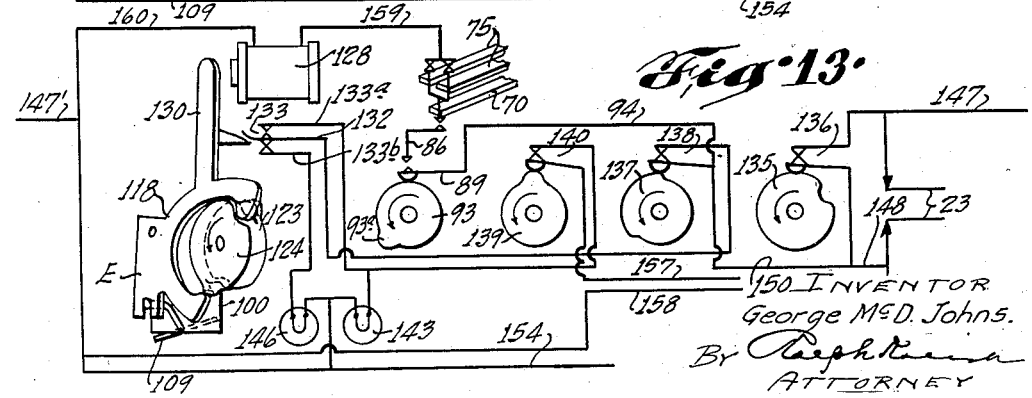

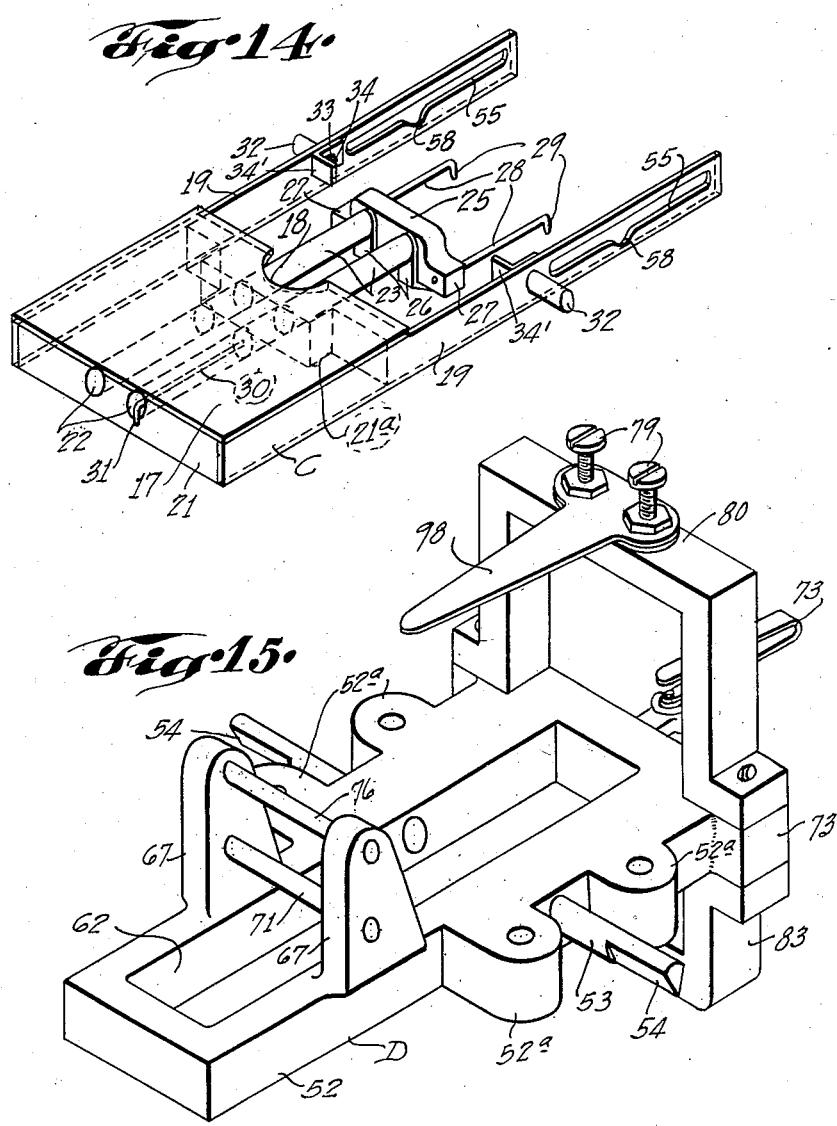

May 7, 1935.　　　　G. McD. JOHNS　　　　2,000,519
COIN SELECTOR
Filed Jan. 19, 1931　　　9 Sheets-Sheet 7

INVENTOR
George McD. Johns.
BY Ralph Kalish
ATTORNEY

May 7, 1935.  G. McD. JOHNS  2,000,519
COIN SELECTOR
Filed Jan. 19, 1931   9 Sheets-Sheet 8
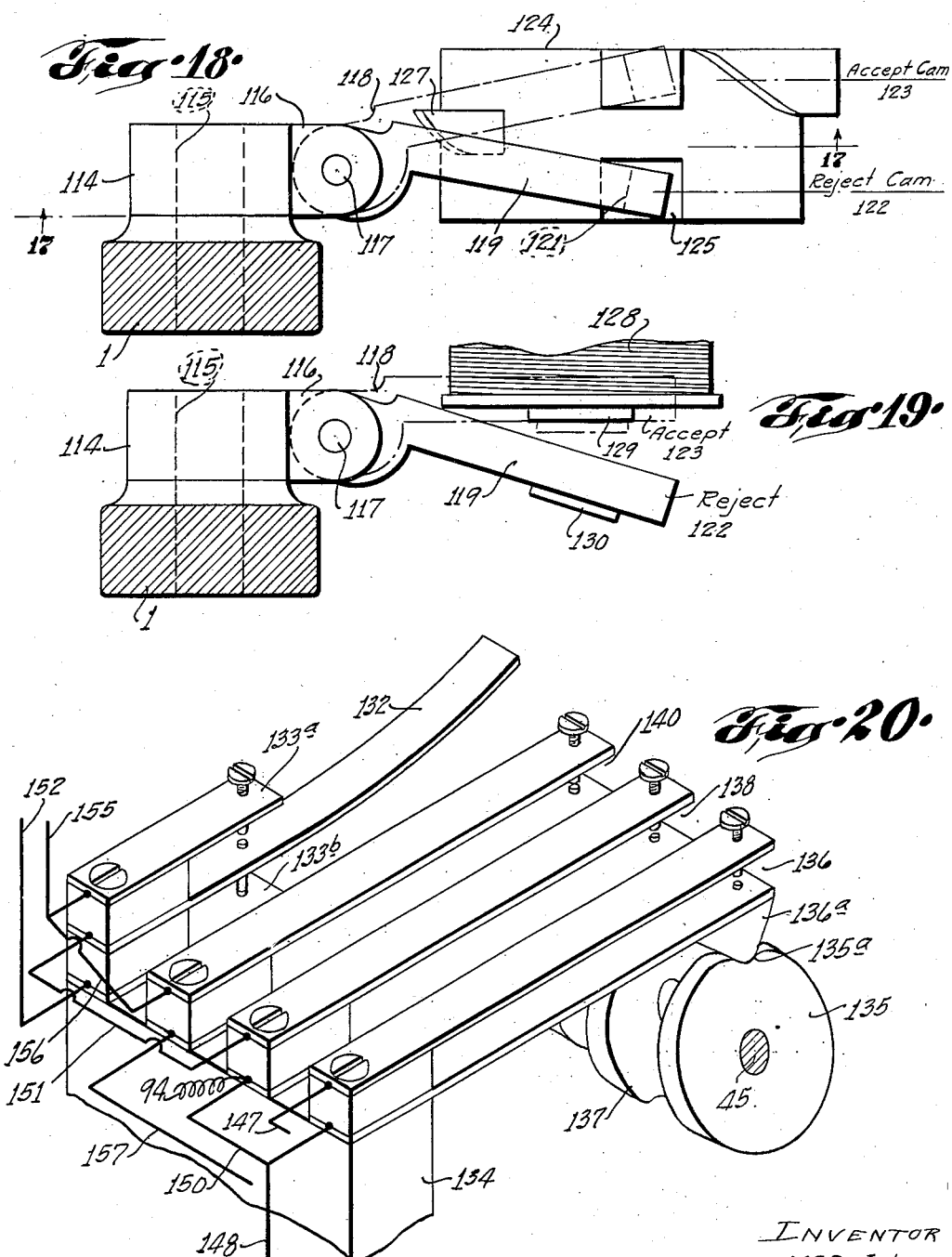

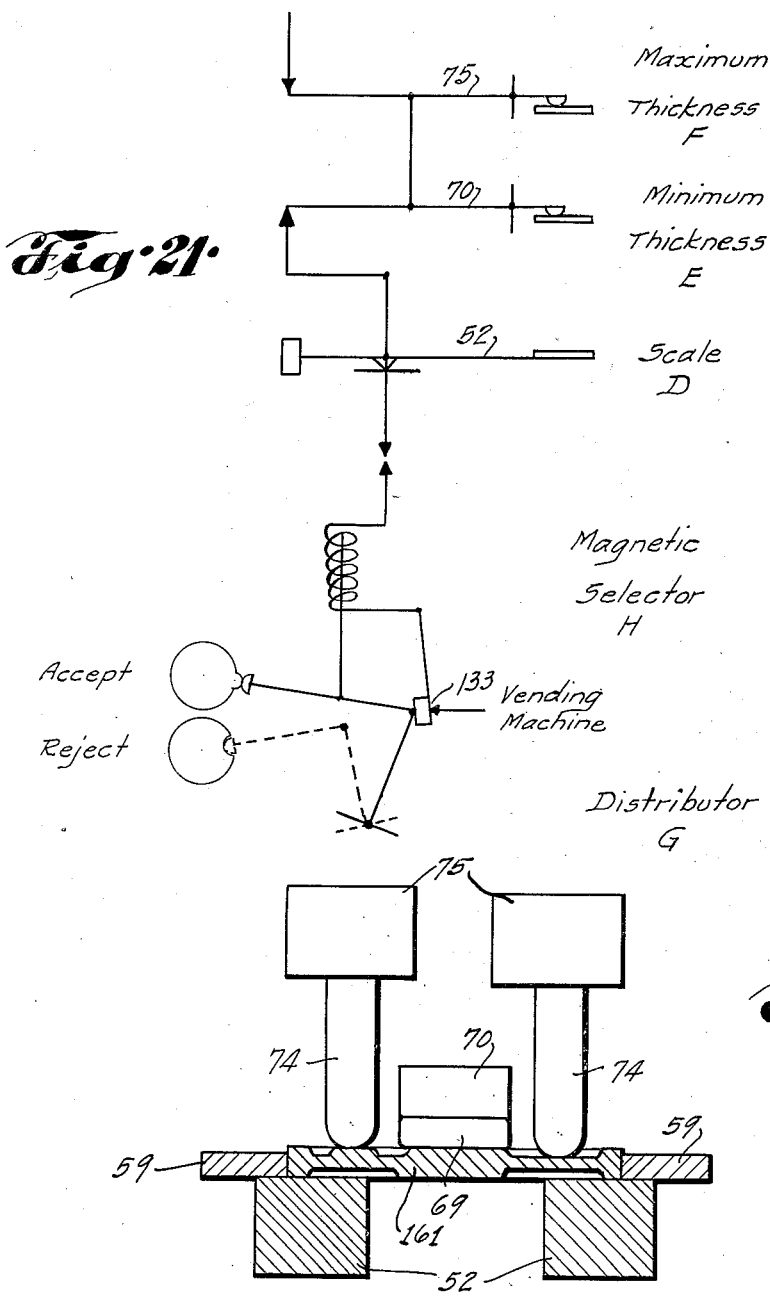

Patented May 7, 1935

2,000,519

UNITED STATES PATENT OFFICE 2,000,519

COIN SELECTOR

George McD. Johns, near Sappington, Mo.

Application January 19, 1931, Serial No. 509,581

60 Claims. (Cl. 194—102)

This invention relates generally to check-controlled apparatus. More particularly, my invention relates to a certain new and useful improvement in apparatus or machines adapted automatically for weighing and measuring coins, metal checks, and the like and is adapted for use especially, though not exclusively, with automatic vending machines and the like.

My invention has for its chief object the provision of an automatic mechanism adapted for selecting or detecting metal coins and differentiating between the same and slugs and counterfeits or imitations, or, as may be said, between acceptable and non-acceptable coins, the mechanism being adapted additionally for controlling vending machines or similar apparatus, as well as also for use as a coin tester or distributor or other like purposes.

Other objects of my invention are to provide a machine or apparatus of the type stated comprising a plurality of coin-responsive devices operable for subjecting a coin or check to particular dimensional and gravitational tests for distinguishing between acceptable and unacceptable coins; to provide a mechanism for separating and selecting valid or proper coins and checks from invalid or improper coins or checks, whereby the former may be collected suitably for retention in the machine, and the latter cast out or ejected therefrom; to provide a machine of the type stated with a coin-distributing device actuable on operation of a coin gauging means responsive to the dimensional and gravitational characteristics of the coin being gauged; to provide in connection with such a machine for visually indicating the acceptance or rejection of a coin; and to generally improve the construction of check-controlled machines and apparatus of the class mentioned.

And with the above and other objects in view, my invention resides in the novel features of form, construction, arrangement, and combination of parts hereinafter described and pointed out in the claims.

In the accompanying drawings:—

Figure 1 is a reduced exterior front view of a coin gauging and selecting machine embodying my invention;

Figure 2 is an enlarged front fragmentary view of the machine, parts thereof being broken away to show the interior arrangement;

Figure 2a is a reduced fragmental detail sectional view of the coin-receiving-shelf of the machine;

Figure 3 is an enlarged side view, partly broken away and in section, of the machine, taken approximately along the line 3—3, Figure 2;

Figure 4 is a fragmentary rear view, partly broken away and in section, of the machine, taken approximately along the line 4—4, Figure 3;

Figure 5 is a fragmentary sectional side view of the machine, taken oppositely to Figure 3, approximately along the line 5—5, Figure 4;

Figure 6 is a fragmentary detail plan view of the mechanism for gauging the thickness of a deposited coin, other parts of the machine being omitted;

Figure 7 is a side elevation of the mechanism shown in Figure 6;

Figure 10 is a view of the electrical circuit of the machine during the coin-selecting operation thereof, as existing on acceptance of a coin;

Figure 11 is a view similar to Figure 10, as existing on rejection of a coin;

Figure 12 is a view of the electrical circuit during the distribution of the coin, as existing on acceptance of a coin;

Figure 13 is a view similar to Figure 12, as existing on rejection of a coin;

Figure 14 is a perspective detail view of the coin-feeding slide of the machine;

Figure 15 is a perspective detail view of the balance frame and attached parts of the weight-gauging mechanism of the machine, the movable parts thereof being omitted;

Figure 18 is a detail plan view of the follower of Figure 17, the same being shown in shifted coin-accepting relation with the distributor cams, the coin-accepting position being shown in dot-dash lines, and other parts being removed;

Figure 19 is a detail plan view of the magnet of Figure 17, the same being shown in coin-rejecting relationship with its armature and the follower, the coin-accepting position being shown in dot-dash lines, and other parts being removed;

Figure 20 is a fragmentary perspective view of the coin-operated switches of the machine;

Figure 21 is a diagrammatic view of the electro-responsive coin-selecting functional relationships of parts of the machine; and Figure 22 is an enlarged sectional view through a coin in cooperation with the coin thickness-gauging mechanism of the machine.

Figure 8:
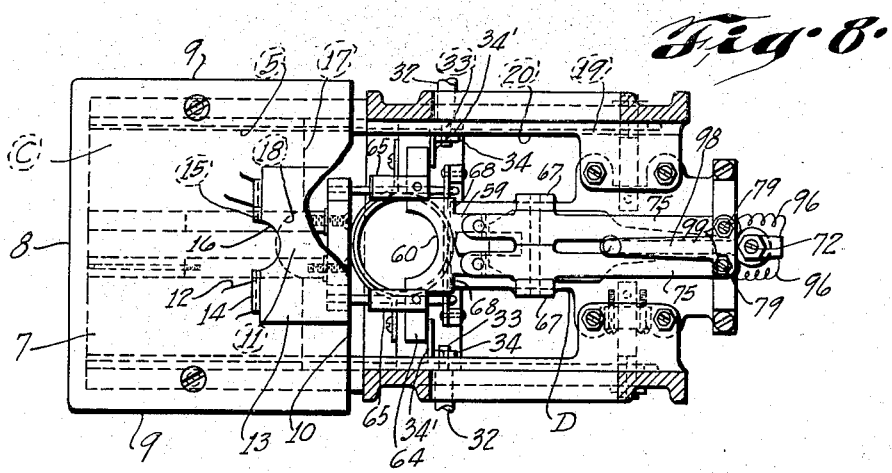
Figure 8 is a plan view of the coin-feeding and gauging mechanism, taken approximately along the line 8—8, Figure 3, parts thereof being broken away and the housing removed.

Referring now more in detail and by reference characters to the drawings, which illustrate a preferred embodiment of my invention, the operating parts of the machine are preferably, for preventing unauthorized manipulation thereof or tampering therewith, housed in a casing or shell A, which may be of any suitable character, such, for instance, as shown in Figure 1, adapted to rest on a counter, table, or the like, and which may, if desired, while not here specifically shown, directly house the vending machine proper.

The main frame B of the machine preferably comprises a pair of suitably spaced standards 1 upstanding from a base-plate 2 supported preferably by and between the front and rear walls 3 and 4, respectively, of the shell or housing A.

Intermediately disposed horizontally in the main frame B and preferably extending forwardly from the rear thereof, is a pair of laterally spaced parallel guide-bars or rails 5 preferably integral with the respective standards 1, the rails 5 at their forward end projecting in bracket-like manner through a substantially rectangular aperture or slot 6 provided suitably for the purpose in the front wall 3 of the shell A.

Accessibly for customers' convenience supported exteriorly the housing A on the bracket-extensions of the rails 5, is a coin-depository which includes a shelf or table 7 having depending front and side flanges 8 and 9, respectively, for concealing the exposed portions of the rails 5 and the space horizontally therebetween, the shelf 7 at its rear margin 10 projecting edgewise into the aperture 6, as best seen in Figure 3.

Figure 16:
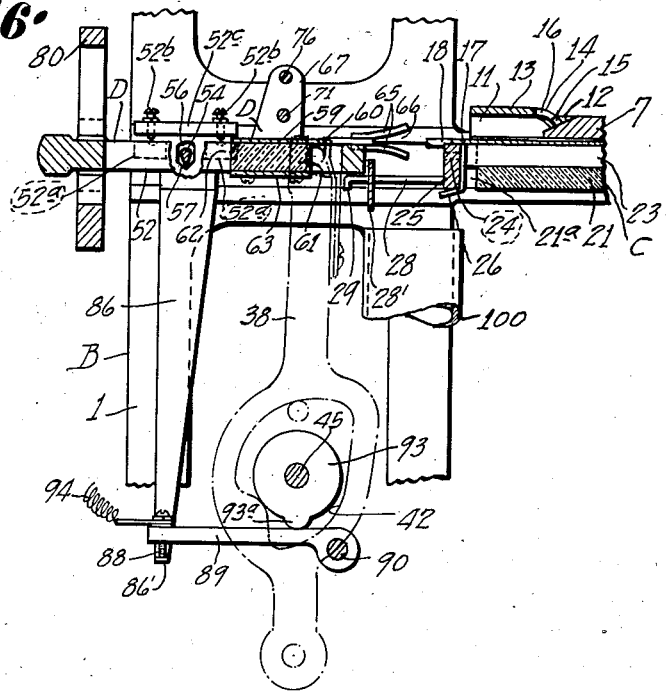
Figure 16 is a fragmentary sectional view taken approximately along the line 16—16, Figure 4, showing the machine in the operation of weighing a coin, the parts cooperating for such purpose being shown and the other parts omitted or removed.

For coin depositing purposes, I prefer to provide a coin-chute which includes a circular coin-receptive recess 11 disposed centrally in said rear marginal portion 10 of the shelf 7, the front wall of the recess 11 being suitably chamfered or provided with a sloping coin-channel or passageway 12, as best seen in Figures 2a and 16, for slidable insertion of a coin from the top surface of the shelf 7 into the recess 11. A plate 13 covers the recess 11 and has its forward end-portion 14 suitably bent or curved downwardly for snugly fitting into the coin-channel 12, the plate-portion 14 having a transverse coin-receiving notch or slot 15 suitably formed for determining or limiting the maximum dimensions of the particular coin admissible for coin-depositing purposes into the machine. The plate-portion 14 is further, for coin-manipulative convenience, provided with an arcuate finger-notch 16, as also best seen in Figure 16.

The coin-feeding mechanism of the machine includes a slide or shiftable frame C, best seen in Figure 14, said frame C supporting a shiftable coin-engaging member or plate 17 normally disposed in forwardly presented or retracted position beneath the coin-shelf 7, said plate 17 having in its rearward marginal portion a semi-circular notch 18 adapted normally for registration with the recess 11 in the shelf 7. The plate 17, for rearwardly shiftable coin-feeding actuation thereof projectingly from the shelf 7, is preferably integrally connected to a pair of spaced rearwardly extended side bars 19, each depending from a side of the plate 17 for reciprocation in a pair of opposing horizontally disposed ways 20 provided longitudinally in the rails 5 of the frame B complementary to the side-bars 19, Figure 2.

Supported beneath the plate 17 between the side-bars 19, is a block 21 having a pair of spaced parallel longitudinal horizontal bores 22 peripherally adjacent the underside of the plate 17 for guiding reception of the respective forward ends of a corresponding pair of coin-carrying plungers 23, which at their rearwardly projecting ends are suitably reduced in section, as at 24, for abuttingly engaging a connecting transverse bar 25 preferably, for slidable discharge of a coin thereover, flush with the tops of the plungers 23. The plungers 23 are actuable shiftingly in the bores 22 normally for extension from the block 21 in coin-carrying position under and across the recess 11 and notch 18 for deposit of a coin therefrom supportingly upon the plungers 23. The plungers 23 for coin-feeding discharge of the coin therefrom are adapted for retraction into the block 21 until the bar 25 passes beneath the plate 17, the block 21 having a suitable recess 21a for reception of the bar 25 in said retracted position, and said coin, I might add, being engaged by the walls of the notch 18 on such retraction of the plungers 23 under the plate 17 for discharge of the coin over the ends of the plungers, as shortly appearing.

The plungers 23 are preferably constructed of electrically conducting material, and the block 21 and connecting bar 25 are, for electrically insulating the plungers 23, constructed preferably of suitable insulating material.

Engaged between the shoulders of the reduced plunger-ends 24 and the bar 25 and depending from the bar 25, is a pair of preferably flexible contact members 26 for cooperative engagement, when the plungers 23 are disposed in normal or forwardly shifted position, with respective terminals 26a, 26b, connected in the electrical circuit of the machine, as later appearing, said plungers being normally insulated from each other for coin-conducting connection thereof on deposit of a coin thereon.

At each of the laterally opposite ends of the bar 25, is an outstanding ear or lug 27, each carrying a rearwardly projecting horizontal rod 28 adapted for sliding movement in and through a fixed transverse plate or frame member 28' connecting posts 104 upstanding from a cross-member 103 mounted on the frame members 1. Each of said rods 28 is provided at its free or rear end with a depending hook or stop 29 adapted for impinging the rear side of the plate 28' for automatic shiftable extension of the plungers 23 from the block 21 on retraction thereof, as will later more particularly appear.

Also preferably at least one of the plungers 23 is provided with an axial forwardly projecting rod 30 disposed in the corresponding one of the bores 22, said rod 30 having preferably a depending hook 31 adapted for engagement with the front side of the block 21 for limiting the rearward movement of said plungers in said block 21.

Projecting laterally outwardly from the opposite sides of the frame C at an intermediate point from the respective bars 19, is a pair of opposed pins 32, each having a suitably reduced end 33 passing through the corresponding bar 19, said reduced-end 33, for securing the pin 32 to the bar 19, being preferably threadedly engaged by a nut 34 abutting the inner side of the bar 19, and it may be stated that preferably secured between each of the nuts 34 and the corresponding bar 19, is a stop-angle 34', the inturned leg thereof being forwardly presented, as best seen in Figures 8 and 14, for a purpose later appearing.

The pins 32 extend through and reciprocate freely in slots 35 provided longitudinally in the respective rails 5 of the frame B, said pins 32 projecting sufficiently beyond the side members 1 of the frame B for operative engagement each between an endwise presented rearward lug 36 and a like endwise presented forward spring 37 provided on the swingable end of the corresponding one of a pair of vibratory levers 38, said spring 37 being attached by a suitable fastening element 39 to the shank of the lever 38, as best seen in Figure 3.

The vibratory levers 38 are disposed one on each side of the frame B for operation thereof in unison, said levers being fixed on a transverse shaft 40 rockable in suitable bearings 41 depending from the opposite sides of the base plate 2. Said levers 38 are normally forwardly urged by means of a pair of springs or like resilient members 41a suitably mounted on opposite ends of the shaft 40 for yieldingly engaging their free ends with suitable parts of the frame B, as best seen in Figures 2 and 3.

At an intermediate point, the shank of each lever 38 is suitably widened and apertured for providing an irregularly shaped ring-cam 42, which, for oscillatory actuation of the lever 38 for correspondingly reciprocatorily shifting the slide C, is adapted for cooperation with a wrist pin 43 mounted on a rotatory face-plate or disc 44, the pin 43 being annularly actuated on rotation of the disc 44 for operatively engaging the several interior cam-walls of the cam ring 42 with corresponding vibratory actuation of the lever 38 associated therewith, as will presently more particularly appear, but I may at this time briefly describe the several cam-portions of the ring-cam 42, as follows, reference being had to Figure 3: a designates the cam corresponding to the normal or non-operative coin-depositing position of the lever 38, the slide C being in extreme forward position; b designates a rising cam for actuating the lever 38 and slide C to extreme rear coin-feeding position; c designates a falling portion for allowing the lever 38 to be actuated forwardly by means of the resilient member 41a operating through shaft 40 to said lever 38 and thus returning the slide C to coin-weighing position, and d is a dwell or concentric portion of the cam for holding the slide C in said coin-weighing position for a period of time pending the completion of the coin-gauging and selecting operations of the machine; e designates a rising portion for shifting the slide C to extreme forward position for discharging the coin from the gauging mechanism; and f designates a dwell or concentric portion designed to permit the completion of the coin-distributing operation before the machine comes to rest. This completes the operative cycle of the machine, the several operations mentioned being presently more particularly described.

The discs 44 are respectively fixed on the opposite ends of a transverse rotary main-shaft 45 journaled in suitably provided parts or members of the frame B, the shaft 45 being rotarily actuated by means of a gear 46 mounted thereon and meshing with a worm 47 mounted on a shaft 48 journaled suitably in the frame B. The shaft 48, in turn, carries at its rearward end preferably a gear 49 meshing with a pinion 50 actuated by a suitable prime mover, such as an electrical motor 51, suitably supported upon the base-plate 2 at the rear of the frame B, as best seen in Figure 3.

Adapted for rockable actuation in the main frame B, is a coin-weighing gauge or balance D, which includes preferably an oscillatory balance-frame 52, best seen in Figure 15, divested of its movably attached parts. Said frame 52 for coin-receptive feeding purposes is disposed normally in alignment with the plungers 23 between the side bars 19, the front end of the frame 52 being swingably disposed rearwardly adjacent the plate 28'. Suitably for coin-weighing purposes, the frame 52 is provided with intermediately disposed oppositely projecting preferably cylindrical fulcrum shafts 53, each formed at its outer end with a V-shaped or acuminate fulcrum-edge or pivot 54, which are adapted for normally slidably engaging, in fulcrum-lifted or non-oscillatory position, the respective lower walls of a pair of horizontally aligned slots 55 provided longitudinally in the respective side bars 19 of the coin-feeding frame C, the fulcrum portions 54 of the shafts 53 respectively being normally suspended, for vertical shiftable movement, projectingly in respective opposing fulcrum-receptive vertically elongated apertures 56 provided each suitably in one of the frame members 1 in horizontal alignment and registration with said slots 55 in the side bars 19.

Preferably, for restraining the frame 52 against longitudinal movement in the frame B, the fulcrums 54 vertically slide between the yoke-arms 56a of a pair of detachable retaining pieces 56b suitably for the purpose mounted accessibly on the outside of one of the frame-members 1, as best seen in Figure 3.

Normally the frame 52 is disposed in fulcrum-elevated coin-receiving or coin-discharging non-weighing position, but at certain presently described positions of the reciprocating frame C, the fulcrums 54 are, for oscillatory coin-weighing actuation of the balance D, adapted to be lowered or shifted-downwardly in the apertures 56 for pivotally or rockably engaging corresponding V-shaped fulcrum bearings 57 formed in the respective lower walls of the apertures 56, the lower walls of the corresponding side bars 19 being provided with intermediately disposed transversely aligned notches 58 adapted for registration with the apertures 56 for disengaging said fulcrums 54 and dropping or lowering the same suitably for such coin-weighing purposes.

Preferably, for controlling the oscillations of the balance D, the frame 52 is provided, on each side of the pivot-shafts 53, with a pair of oppositely projecting lugs 52a adapted on oscillation of the frame 52, for alternate impingement with corresponding pairs of stop-screws 52b adjustably threadedly engaging, and depending from, suitably disposed lugs 52c projecting respectively inwardly from each of the frame members 1, as best seen in Figures 5 and 16.

Slidably mounted on the upper face of the front end of the balance frame 52, is a reciprocable coin-receptive positioning member or plate 59 having in its forward marginal portion a semicircular notch 60 oppositely complementary to, and adapted for registration in coin-holding co-operation with, the notch 18 of the coin-feeding plate 17.

The positioning plate 59 is mounted on a block 61 guidably movable in a slot 62 provided longitudinally in the frame 52, a retaining plate 63 being mounted on the under-side of the block 61 for slidably engaging the lateral portions of the bottom side of the frame 52, as best seen in Figure 16.

A pair of ears or lugs 64 project laterally, from respective sides of the forward end of the plate 59, and are adapted for impingement by the members 34' of the slide C for forward shifting coin-discharging actuation of the plate 59, as will later appear. Presented forwardly from each ear 64, is a pair of spaced oppositely flaring upper and lower fingers 65, each pair of said fingers 65 forming a throat, as at 66, adapted for guiding reception of the advancing opposite side edges of the plate 17 on coin-feeding rearward actuation thereof for cooperative horizontal alignment of the opposing walls of the notches, 18, 60, Figures 5 and 16.

Intermediately upstanding from opposite sides of the frame 52, is a pair of standards 67, the plate 59 being suitably narrower for passing between said standards 67 and having opposite lateral shoulders 68, which for precise positioning of a coin a predetermined distance from the pivotal axis of the balance-frame 52, are adapted for impingement with said standards 67 for limiting the rearward movement of the positioning plate 59, Figure 8.

Mounted on the balance frame 52 for yielding thickness-gauging gripping cooperation with a coin, disposed upon the upper surface of the forward end of the frame 52 by said rearward actuation of the plate 59, is a so-called minimum-thickness gauge E, which includes a coin-engaging shoe 69 projecting forwardly from an oscillatory lever 70 extending longitudinally of the frame 52, said lever 70, for coin-responsive oscillation thereof, being intermediately pivotally supported on a lower transverse shaft 71 mounted through the standards 67. The lever 70 is normally urged in coin-gauging position by means of a resilient member or leaf-spring 70a suitably for the purpose attached at one end to the underside of the lever 70 near the pivotal point thereof for yielding downward engagement of the other or rearward end of the spring 70a with the frame 52.

Adjustably threaded insulatably through the rearward preferably narrowed swingable end of said lever 70, is a depending contact screw 72 normally spaced from, but adapted, on coin-gauging rocking actuation of said lever 70, for cooperative engagement with the upper or yielding arm of a horizontally disposed U-shaped resilient spring-contact 73, the lower arm thereof being insulatably mounted on a fastening element or bolt 73' of conducting material insulatably passed through a boss 73a projecting rearwardly from the rear-end-cross member 73b of the frame 52. Said contacts 72, 73, are normally disengaged, but are adapted for circuit-closing engagement thereof on gauging cooperation of the lever 70 with a coin of more than predetermined minimum thickness at its approximate center.

Also mounted on the balance frame 52, is a pair of so-called maximum thickness gauges F, each of which includes a pair of preferably round-nosed coin-engaging pins or fingers 74 depending respectively from a pair of parallel switch levers 75. Said levers 75 are adapted, as presently appearing, for yielding thickness-gauging gripping cooperation with the coin disposed on the upper surface of the frame 52 and are constructed preferably of insulating material. Preferably, the levers 75 are disposed one on each side of, and above, the minimum thickness-gauging lever 70, being for such purpose intermediately pivotally supported on an upper transverse shaft 76 mounted through the standards 67, whereby the levers 75 are adapted for oscillation independently of the lever 70 and of each other. A pair of resilient members or leaf springs 77 is mounted on the upper side of the lever 70 for yielding upward engagement of the rearward ends of said springs 77 each with one of the levers 75.

Each of said levers 75 carries, at its hence upwardly urged rearward end, a contact 78 adapted normally for impinging circuit-closing engagement with the corresponding one of a pair of contact-screws or posts 79 dependingly threaded adjustably through the upper transverse bar of an inverted U-shaped frame 80 upstanding from the rear member 73b of the balance frame, 52.

The contacts 78, 79, of either, or both, of the levers 75 are normally engaged, but are adapted for circuit-opening disengagement thereof on gauging cooperation of the particular lever 75 with a coin of greater than maximum thickness.

It may at this time be stated that the gauging levers 75 are adapted for engagement of their carried fingers 74 with the depressions, or the valleys, as may be said, of the coin being measured. In this particular, it is to be borne in mind that most, if not all, coins are embossed, more or less, at their central portions; hence, as best seen in Figure 22, the function of the gauge-fingers 74 is to each independently explore the lateral side or marginal portions of the coin for locating and accurately determining the lowest point of said valleys or depressions of one face of the coin as related to the plane surface of the frame 52 engaged by the other face of the coin. As the embossed portion of the coin is apt to be irregularly shaped, the pair of fingers 74 are independently actuable in order that at least one may be engaging a valley even when the other is engaging a height of the embossment.

On the other hand, the gauging lever 70 measures with its carried shoe 69 the height or total thickness of the central or embossed portion of the coin, it being understood that, in each case, the coin must be of a certain predetermined standard of thickness at the valleys and the height to pass the tests imposed upon it by the respective thickness gauges E and F.

Additionally, however, the machine is adapted for subjecting the coin to an accurate test of its weight, coincidental with the thickness test. For such coin-weighing purposes, the balance D may be adjustably counter-balanced, for predetermined weight of the coin being gauged, by means of a weight 81 slidably mounted on a pair of spaced parallel weight-supporting rods 82 longitudinally projecting under the frame 52 from an inverted U-shaped hanger 83 depending suitably from the end member 73b. Said weight 81 is longitudinally shiftably actuable for balancing purposes by means of a screw 84 threadedly engaging the weight 81 and journaled suitably in the depending cross member of the hanger 83, said screw 84 for convenient manipulation thereof being provided with a knurled head 85.

A so-called balance-switch-arm 86, preferably of conducting material, depends from an insulation block 87 mounted for the purpose suitably on one of the shafts 53 and secured thereto by suitable fastening elements for oscillation with the frame 52. The lower end of the arm 86 is preferably right-angularly bent providing a projecting contact 86' adapted for swingable actuation on oscillation of the balance D. Adapted for movement at selected intervals for intersecting the arcuate path of the contact 86', is a balance switch-contact-screw or post 88 adjustably threaded dependingly through one or the swingable end of an oscillatory balance-switch lever 89, whose other or hinged end is disposed forwardly of the main shaft 45 and pivotally supported on a shaft 90 mounted through bearings 91 upstanding suitably from the base plate 2 of the frame B, said lever 89 being normally held yieldingly in elevated open-circuit position by means of a resilient member or leaf-spring 92 attached to one end of the underside of the lever 89 for downwardly bearing its other end on the base plate 2.

Fixed on the shaft 45, is a plate-cam 93 having an edge-cam tooth 93a adapted for engagement, at a selected period of operation of the machine, with the lever 89 for downward actuation of the contact-screw 88 in circuit-closing direction, said contact 88 being adapted for impinging cooperative engagement with the contact 86' on coin-weight gauging actuation of the balance D responsively only to deposit thereon of a coin of correct or predetermined weight.

A pigtail 94 electrically connects the contact 88 with one side of the electrical circuit of the machine, and a lead 95 similarly connects the arm 86 with the conducting bolt 73' and, hence, the spring contact 73. Suitable pigtails 96 also electrically connect the contact 72 with the contacts 78, and a pigtail 97, attached to the end of a tongue 98 of conducting material forwardly projecting from, and secured by nuts 99 in electrical connection with, the contacts 79, leads suitably to the other side of the electrical circuit of the machine, as will presently more particularly appear.

The coin distributing mechanism G of the machine includes a preferably cylindrical open ended vertical coin-chute 100 disposed in coin-receptive position in front of and beneath the forward end of the balance D for gravity discharge of coins therefrom into said chute 100 on forward actuation of the plate 59 following the thickness and weight gauging operations of the machine. Preferably the chute 100 is clamped by a semi-circular band 101 to a complementary saddle 102 formed in the cross-member 103 transversely disposed between and supported by the frame members 1. As has been stated, for supporting the plate 28', the pair of posts 104, upstanding from the cross-member 103, is provided. Preferably, the lower open end of the chute 100 terminates just above the front margin of the base-plate 2, the latter having at this point a suitable aperture 105 closed by a front wall 106 formed with a forwardly sloping upper edge 107, as best seen in Figure 5. The wall 106 depends below the base 2 for supporting a forwardly projecting bracket-like-coin-receiving or reject-tray 108, accessibly for customers' convenience presented through the front wall 3 of the housing A, as shown in Figure 3.

Normally closing the lower end of the chute 100, is an oscillatory valve 109 suitably mounted on a rod or shaft 110 journaled through a pair of lugs 111 depending suitably for the purpose from the opposite sides of the chute 100.

For tilting actuation of the valve 109 in alternate coin-distributing directions, said rod 110 preferably is provided at an end with a crank 112 having a crank-pin 112' adapted for engaging a slotted yoke 113 depending from the swingable end of a vibratory lever 114, which latter is pivotally suspended from a pin 115 horizontally projecting suitably for such purpose from the adjacent frame-member 1. On its rearward edge, the lever 114 is provided with a pair of spaced hinge-lugs 116, through which is passed a vertical pintle 117 for hingedly supporting, in cooperation with said lever 114, a horizontally swingable substantially C-shaped cam follower 118, the latter, it will be seen, having a universal movement, that is, adapted for both vertical and horizontal swinging movement about the pivots 115 and 117, respectively. Said follower 118 includes a pair of cam-embracing jaws, of which the upper jaw 119 preferably rearwardly projects a greater distance than the lower jaw 120 thereof, said jaws 119, 120, being disposed on opposite sides of the main shaft 45 and carrying at their respective ends opposed cam-engaging teeth 121, the diametrical axis of said teeth preferably for most efficient operation of the device being substantially at right angles to the axis connecting the pivot pin 115 and shaft 45.

The follower 118 is adapted for coin-responsive selective engagement with a pair of axially-aligned positive motion edge cams 122, 123, one cam, as 122, being adapted for actuating said lever 114 in one, or coin-rejecting, direction and the other cam, as 123, being adapted for actuating said lever in opposite, or coin-accepting, direction. In actual practice, I prefer to mount a drum 124 on the shaft 45, said drum having a diameter to revolve between the teeth 121, one end of the drum carrying the cam 122 and the other end the cam 123, a short cylindrical or neutral section of the drum 124 being provided intermediate said cams, as best seen in Figure 18.

For brevity, I shall refer to the outer cam 122 as the "reject" cam, and the inner cam 123 as the "accept" cam. The cam 122 is, preferably, formed with a radially depressed cam-notch 125 and a complementary diametrically opposite radially projecting cam-tooth 125'; in a similar manner, the cam 123 is formed of a radially projecting cam tooth 126 disposed, however, axially opposite the notch 125, there being, hence, diametrically opposite the tooth 126 a complementary cam-notch 126' axially opposite the tooth 125'. Between the respective teeth and notches, the cams 122, 123, are peripherally concentric with the shaft 45 and merge with the surface of the drum 124.

Mounted on the drum 124 between the cams 122, 123, with a suitable advance or lead ahead of the tooth 126 and notch 125, is a reject shifter cam 127 having an axially outward throw adapted for engaging the alternate teeth 121 for normally outwardly shifting the follower 118 onto the reject cam 122, as shown by solid lines in Figure 18. In such position, the reject cam 122 acts to depress the follower 118, swinging the lever 114 forwardly, and tilting the valve 109 for discharging into the reject tray 108 any coin contained at that time in the chute 100, such coin, as will be understood, having been "rejected" by the gauging mechanism as of improper weight or dimensions.

The distributing mechanism G is controlled by a magnetic-selector H, which includes a magnet 128, mounted suitably in the frame B above the main shaft 45 and having a pole 129 adapted for magnetic cooperation with an armature 130 upstanding from the upper jaw 119 of the follower 118. Normally, as best seen in Figure 19, the armature 130 is spaced from the pole 129, the follower 118 being freely swingable for engaging the cam 122, but on energization of said magnet 128, the follower 118 is hence inwardly shifted onto the accept cam 123, as shown by dot-dash lines in Figures 18, 19, whereby said cam 123 acts to elevate the follower 118, swinging the lever 114 rearwardly, and tilting the valve 109 for discharging, through the aperture 105, and into a suitable hopper disposed in the bottom of the casing A, any coin contained at that time in the chute 100, such coin, it will be understood, having been "accepted" by the gauging mechanism as of correct weight and dimensions.

Figure 17:
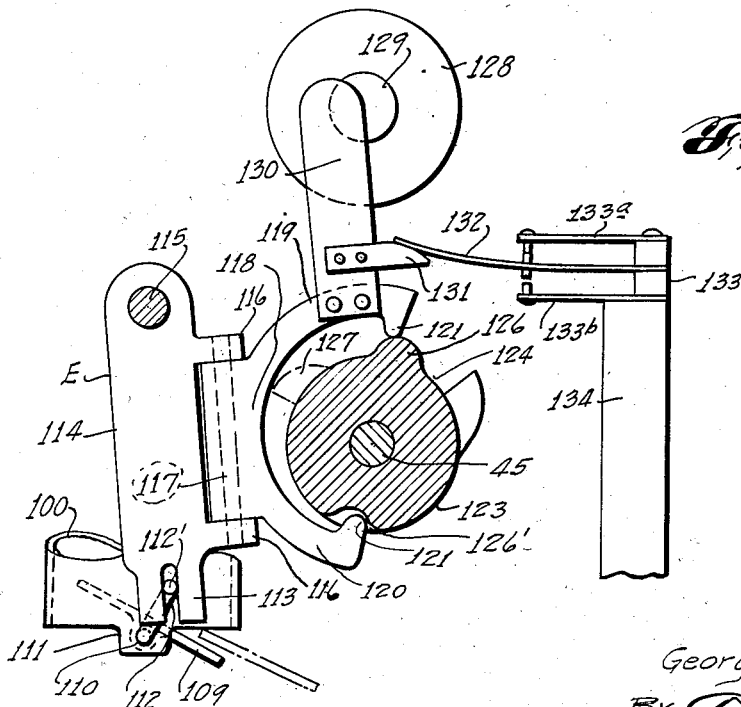
Figure 17 is a detail side view of the coin-distributing mechanism of Figure 5, shown in coin-accepting position.

The armature 130 carries a rearwardly and inwardly projecting switch-actuating lifter-arm 131 of insulating material, adapted, on follower-shifting energization of the magnet 128, to be positioned beneath, for subsequent lifting impingement with, a resilient spring switch contact arm 132 of conducting material. The contact arm 132, I may here state, constitutes the movable member of a double-throw so-called "selector" switch 133 mounted suitably on an insulating block 134 disposed in the rear portion of the frame B, said switch 133 comprising an upper pole 133a and a lower pole 133b, and said switch 133 being suitably, as will later appear, connected in the electrical circuit of the machine, with the contact arm 132 normally engaging the lower pole 133b. However, on follower-lifting actuation of the accept-cam 123, the lifter arm 131 acts to lift the contact arm 132 disengagingly from the lower pole 132b into circuit closing engagement with the upper pole 132a, as best seen in Figure 17.

For energizing the several electrical circuits of the machine, as presently appearing, a bank of cam-operated switches is provided, best seen in Figure 20, and now to be described. Mounted on the shaft 45 preferably adjacent the gear 46, is a plate-cam 135, which is concentric with the shaft except for a single peripheral notch 135a, and which is adapted for cooperation with a single pole spring switch 136 forwardly projecting from the insulation block 134, as best seen in Figure 20, said switch constituting the cut-off switch adapted for controlling the supply of electrical energy to the machine. The lower or movable contact member of the switch 136 carries an insulation follower 136a normally residing in the notch 135a in circuit-opening position, but adapted, on rotation of said cam 135, to at once liftingly engage the periphery thereof in circuit-closing actuation of the switch 136 during the cycle of operation of the machine, that is, for one complete revolution of the shaft 45, on completion of which the supply-circuit is interrupted and the machine brought to rest.

Axially adjacent to the cam 135, is another plate cam 137 adapted for cooperation with a single pole spring switch 138 also forwardly projecting from the insulation-block 134, the switch 138 being adapted for controlling the supply of current to the movable member 132 of the selector switch 133. The lower or movable contact member of the switch 138 carried a follower 138a adapted normally to engage the cam 137 in circuit opening position of said switch. Rotation of the cam 137, however, causes the follower 138a to reside on the circuit-closing dwell 137a of the cam, substantially during the period of time that the selector switch 133 is subject to actuation by the lifter-arm 131 of the distributor E.

Next adjacent to the cam 137, is another cam 139 adapted for cooperation with a single pole spring switch 140 likewise forwardly projecting from the insulation-block 134, the switch 140 being adapted for controlling the supply of current from the switch 133 to the vending machine proper (not shown). The lower or movable contact member of the switch 140 carries a follower 140a adapted normally to engage the cam 139 in circuit opening position of said switch. Rotation of the cam 139, however, causes the follower 140a to be engaged in switch-closing actuation thereof by a tooth 139a of the cam 139, such engagement occurring just before the switch 138 is opened by the cam 137.

Preferably, the upper part of the casing A is provided with a compartment 141 having in its front wall an opening 142 glazed with a green glass or the like, the compartment 141 having therein a lamp 143, referred to as the accept signal, adapted for illuminating the compartment 141 for visually indicating the acceptance of a coin deposited in the machine.

Below the compartment 141, is another compartment 144 having in its front wall an aperture 145 glazed with a red glass or the like, said compartment 144 likewise having therein a lamp 146, referred to as the reject signal, adapted for illuminating the compartment 144 for visually indicating the rejection of a coin deposited in the machine.

Figure 9:
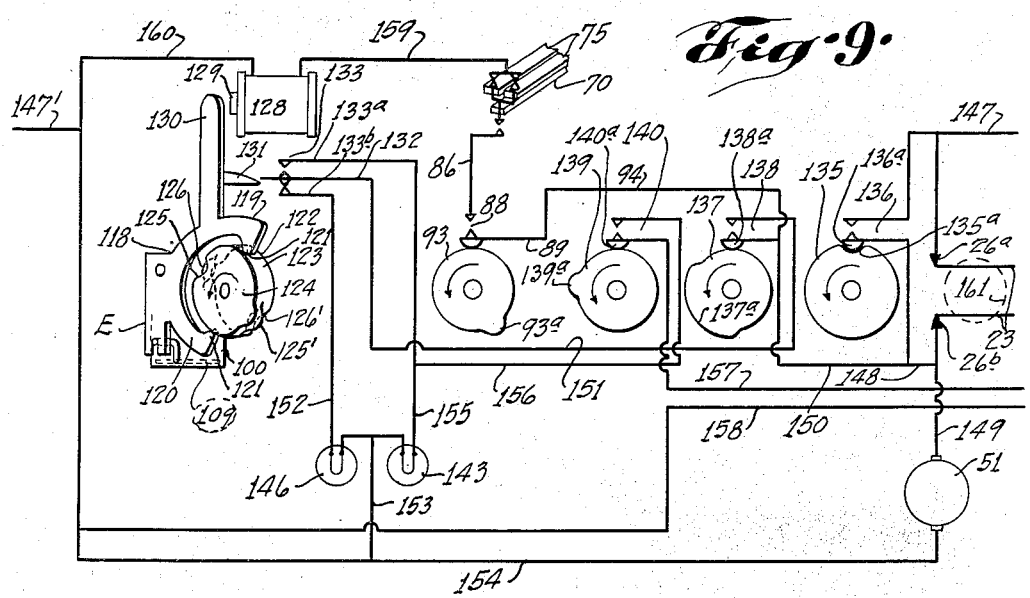
Figure 9 is a diagram of the electrical circuit of the machine, as existing in normal or coin-depositing condition thereof.

Figure 9 diagramatically illustrates the electrical circuit of the machine and also the relative arrangement contours of the several cams mounted on the shaft 45, the view, in such regard, being considered as taken from the rear of the machine and the apparatus in normal position for deposit of a coin in the machine.

Electrical energy from a suitable source (not shown) is supplied to the machine through a pair of leads 147, 147', the supply lead 147 having two branches, one going to the stationary or upper pole of the switch 136, and the other to the contact 26a.

From the lower or movable pole of the cut-off switch 136 extends a lead 148 connecting with a lead 149 extending from the contact 26a to the motor 51. From the lead 148 extends a lead 150 connecting with the movable pole of the switch 138 and also through the pigtail 94 with the contact 88 of the balance switch lever 89.

From the stationary pole of the switch 138 extends a lead 151 connecting with the movable pole 132 of the selector switch 133.

From the lower stationary pole 133b of the selector switch 133 extends a lead 152 connecting with one side of the reject-lamp 146, the other side thereof being connected by a lead 153 to a lead 154 extending from the motor 51 to the return line wire 147'.

From the upper stationary pole 133a of the switch 133 extends a lead 155 connected to one side of the accept-lamp 143, the other side thereof being connected also to the lead 153. The lead 155 from the switch 133 has a branch 156 connected to the stationary pole of the switch 140, the movable pole thereof being suitably connected by a lead 157 with the vending machine for supply of operative current thereto, a return lead 158, as shown in Figure 9, extending from the vending machine for connection with the lead 154.

Suitably connecting with the pigtail 97 of the gauging mechanism, is a lead 159 extending to one side of the magnet 128, the other side thereof being connected through a lead 160 with the return wire 147'.

In use and operation, the cooperant parts and their several particular electrical circuits are normally, that is, when the machine is at rest, in coin depositing position and disposed as best seen in Figures 2, 3, 5, 8, and diagrammatic Figure 9.

Referring now to Figure 9, deposit of a coin in the machine, indicated by the dotted circle 161 establishes metallic connection between the plungers 23, which are, at this time, disposed for engagement of their carried contacts 26 respectively with the contacts 26a, 26b, hence current flow is established through the lead 147, plungers 23, coin 161, and lead 149 to the motor 51, thus starting the machine in motion.

On initial movement of the shaft 45, the cam 135 closes the switch 136, sustaining the supply of current to the circuits 147, 148, 149, after the plungers 23 have become disconnected from the motor-circuit 147, 149, occurring on rearward coin-feeding actuation of the slide C responsive to engagement of the wrist-pin 43 with the portion b of the ring-cam 42.

The coin-carrying plungers 23 move rearwardly with the slide C, until the bar 25 impinges the plate 28', whereupon, as the plate 17 advances, the plungers 23 are retracted thereunder, the coin being meanwhile engaged between the opposing walls of the respective notches 18, 60. Further rearward movement of the plate 17 causes corresponding rearward actuation of the positioning plate 59 over the balance frame 52 for guiding the coin into thickness-gauging engagement with the levers 70, 75, of the gauges E, F, respectively, as best seen in Figures 6 and 7, the wrist-pin 43 meanwhile engaging the portion c of the cam 42 for forwardly returning the slide C to coin-weighing position, that is, for registration of the notches 58 with the apertures 56. The balance D, thus grippingly supporting the coin in cooperation with the thickness-gauges E and F, is now freely oscillatorily suspended on its fulcrums 54 for gauging the weight of the coin, the wrist-pin 43 during this operation engaging the dwell-portion d of the cam 42. After a brief interval of time, sufficient to allow the balance D to come to rest in coin-weighing balanced position, the cam 93 actuates the lever 89 in circuit closing direction for engagement of the contact 88 with the contact 86' if the coin 161 is of proper or predetermined weight, as indicated in Figure 10. Obviously, engagement of the contacts 86', 88, is prevented when a coin of greater or lesser weight than the correct weight is deposited in the machine, the weight of the improper coin causing the frame 52 to balance with the arm 86 angularly disposed, the contact 86' being then swung to one side or the other of the contact 88 and hence out of the path of movement thereof, as indicated in Figure 11. At the same time, the cam 137 closes the switch 138, which remains in such closed position during the actuation of the distributor G and selector H, as presently appearing.

Assuming the deposit of a coin of proper weight in the balance D, electrical current flows from the switch 138 through the balance switch contacts 86', 88', thence through arm 86 and lead 95, through conducting bolt 73' to the contact spring 73. If the coin be of not less than minimum thickness, the gauge E causes electrical connection to be further established through the contacts 72, 73, thence through pigtails 96 to the contacts 78. And if the coin be of not more than maximum thickness, electrical connection remains established through one or the other of the pairs of contacts 78, 79, or both of them, of the gauge F, and from thence to the magnet 128 of the selector H for shifting the follower 118 to the inside of the shifter-cam 127 and onto the accept-cam 123, as best seen in Figure 10.

However, if any of the foregoing conditions remains unsatisfied, that is to say, if the coin be of improper weight or dimensions, the above described electrical circuit will be interrupted or fail to be established at one or more of the several switching points depending on the particular defect in the coin. In such event, the magnet 128 remains de-energized and the follower 118 is engaged by the reject-shifter cam 127 which acts to throw the follower onto the reject-cam 122, as best seen in Figure 11.

Following the outlined operation, which terminates the weight-gauging period of the operative cycle of the machine, the wrist-pin 43 engages the portion e of the ring-cam 42 allowing the levers 38 to be forwardly actuated by resilient members 41a for returning the slide C to normal or coin-receptive position, the plungers 23 and bar 25 moving with the plate 17 in retracted position thereunder for uncovering the chute 100, the stops 34 of the side bars 19 of slide C engaging the lugs 64 for forwardly shifting the plate 59 for discharging the coin from the scale D into the coin chute 100. In the meantime, as the slide C approaches its extreme forward position, the stops 29 impinge the plate 28' for automatically shifting the plungers 23 from the block 21 into normal position extended therefrom for deposit of another coin in the machine. For the remainder of the operative cycle of the machine, the wrist-pin 43 engages the dwell f of the cam 42.

If the coin is selected as acceptable, the cam 123 then actuates the follower 118 in upward direction for correspondingly tilting the valve 109 for rearwardly discharging the coin into the coin-hopper of the machine, the switch 133 being likewise actuated for engaging the contacts 132, 133a. At the same time, the cam 139 closes the switch 140. Current hence flows from the switch 138 through the lead 151 to arm 132 and contact 133a, from which latter the current flow divides, part serving to illuminate the green signal 143 for indicating the acceptance of the coin and part passing through the switch 140 for suitable operation of the vending machine, as best seen in Figure 12.

But if the coin is rejected, the cam 122 actuates the follower 118 in downward direction for tilting the valve 109 for returning the coin to the customer, that is, for ejecting the coin from the machine into the reject-tray 108.

In such case, as will be understood, the contacts 132, 132b, remain in normal engaged position, the switch 140 and signal 143 being hence disconnected. Current then flows from the switch 138 through the contacts 132, 133b, to the red signal 146 only, as shown in Figure 13, for indicating to the customer, by illumination of the signal 146, the rejection of the coin.

The distributing operation having been completed, the cam 137 acts to open the switch 138, following which the cycle is completed when the cam 135 acts to open the cut-off switch 136.

Figure 21 diagrammatically illustrates the functional electro-responsive relationships of the coin-selecting and distributing mechanism of the machine. Normally, as indicated by the dotted lines, the distributor G is actuable for rejecting all coins that may be deposited in the machine, and it is only when the tests imposed by the maximum thickness gauge F, the minimum thickness gauge E, and the weight-gauging balancer D are fully satisfied by the coin, that flow of current in the electrical circuit associated with said gauging mechanisms is established for energizing the selector H, with consequent actuation of the distributor G, hence responsively to said current flow, for accepting the perfect or acceptable coin.

It will, however, be understood that the use of the machine is not confined to gauging coins, my invention being adapted for accurately and effectively gauging other objects capable of differentiation by reason of their size and weight, such other objects being commonly known as checks, slugs, or the like. Also, by obvious modifications of the apparatus, checks and coins of other than circular outline may be successfully selected and sorted by the mechanisms described.

I may here point out that the thickness gauging operation is both mechanically and functionally coincidental with the weighing operation, inasmuch as, during the actuation of the selecting mechanism, the coin or check is firmly gripped or held in thickness gauging position a definite distance from the fulcrums of the balance D, hence, the coin, once deposited on the balance frame 52, is not disturbed or moved until the thickness and weight of the coin have been measured and the future course of the coin through the machine then and there determined.

Other novel features of my invention reside in the manner in which the deposit of a metal check or coin acts to initiate the operation of the machine, thus obviating the use of manually-controlled buttons, plungers, or the like; the means for feeding the coin in a positive manner, not dependent upon gravity, to the gauging mechanism, and afterward, for in like manner removing the coin therefrom; the manner in which the distributing mechanism is actuated independently of and after the completion of the gauging operation, thus enabling the separation and use of the distributing means at points remote from the gauging mechanism; the use of the cam-operated switches, whereby the electrical circuits are most economically normally de-energized, for establishment of current flow, if any, during but a momentary period; the means provided for adjusting the gauging mechanism for effecting the precision requisite for accurately distinguishing good from spurious coins and the like; and the novel mode of visibly indicating to the customer the acceptance or rejection of his coin.

The apparatus, as I have stated, is adapted to control a vending machine, telephone pay station, toll gates, ticket sales machines, or other apparatus which may be built to operate by electric impulse, and it is to be understood that the coin selecting apparatus and the actuated mechanism or machine may be placed at some distance apart.

It is further to be understood that the conformation of some coins might require more than two contacts 15, in order that one of them find a low place or valley in the coin. In other words, it might be difficult, on a quarter or half dollar, for instance, to so space the two contacts shown that, if the coin was turned in a certain position, both contacts would be lifted, and the presence of a third would be necessary to determine the "valley" measurement; and that other changes and modifications in the form, construction, arrangement, and combination of the several parts of the apparatus may be made and substituted for those herein shown and described without departing from the nature and principle of my invention.

Having thus described my invention, what I claim and desire to secure by Letters Patent is—

1. Coin-selecting apparatus comprising, in combination, mechanism including coin-dimensional and coin-weighing gauging means and an electrical circuit associated therewith, coin-distributing means for receiving coins from the gauging means and normally actuable for rejecting all coins, and mechanism for actuating the distributing means responsive to current flow in said circuit for accepting a particular coin on gauging acceptance thereof by the gauging-means.

2. Coin-selecting apparatus comprising, in combination, mechanism including coin-dimensional and coin-weighing gauging means and an electrical circuit associated therewith, means for feeding coins to said gauging means, coin-distributing means for receiving coins from the gauging means, means for normally actuating the distributing means for rejecting a coin non-acceptable by the gauging means, and mechanism for actuating the distributing means responsively to current flow in said circuit for accepting a particular coin on gauging acceptance thereof by the gauging-means.

3. Coin-selecting apparatus comprising, in combination, coin-gauging means and mechanism for feeding coins to the gauging means, said mechanism including a frame shiftable in coin-feeding direction, a coin-engaging member carried by said frame, a pair of plungers slidable in said frame for receiving a deposited coin for subsequent impingement of said coin by said coin-engaging member, and means adapted on coin-feeding actuation of said coin-engaging member for causing coin-discharging retraction of said plungers thereunder.

4. Coin-selecting apparatus comprising, in combination, coin-gauging means and mechanism for feeding coins to the gauging means, said mechanism including a frame shiftable in coin-feeding direction, a coin-engaging member carried by said frame, a pair of plungers slidable in said frame for receiving a deposited coin for subsequent impingement of said coin by said coin-engaging member, means adapted on coin-feeding actuation of said coin-engaging member for causing coin-discharging retraction of said plungers thereunder, other means for causing extension of said plungers to normal position on reverse movement of said coin-engaging member, and further means for limiting said extension of the plungers.

5. Coin-selecting apparatus comprising, in combination, a balance-frame, means for pivotally supporting the fulcrums of said frame for coin-weighing oscillation, and means including members slidably engageable with the fulcrums for lifting said fulcrums from the supporting-means to non-oscillatory position.

6. Coin-selecting apparatus comprising, in combination, a coin-weighing balance-frame, fulcrum means for pivotally supporting said frame for oscillation, and means including a coin-feeding frame having members adapted during coin-feeding actuation thereof for engaging the fulcrums for lifting said fulcrums to non-oscillatory position.

7. Coin-selecting apparatus including, in combination, coin-gauging means comprising a coin-supporting-member, first means shiftable on said member for positioning a coin for cooperative engagement with said gauging means, and second means shiftable toward said member for coin-holding cooperation with said first shiftable means for feeding a coin to said gauging means.

8. Coin-selecting apparatus including, in combination, coin-gauging means comprising a coinsupporting-member, first means shiftable on said member for positioning a coin for cooperative engagement with said gauging means, and second means shiftable toward said member for coin-holding cooperation with said first shiftable means for feeding a coin to said gauging means, said second shiftable means including a first member adapted for edgewise engaging a coin and a second member adapted for cooperation with said first member for flatwise supporting said coin, said second member being actuable by and with said first member in coin-feeding direction.

9. Coin-selecting apparatus comprising, in combination coin-gauging means including a balance-frame, a shiftable coin-positioning member normally extending in coin-receptive position from said frame, and coin-feeding means including a coin-engaging member shiftable toward said frame and adapted for coin-holding cooperation with said positioning member for coin-depositing retraction thereof on said frame.

10. Coin-selecting apparatus comprising, in combination coin-gauging means including a balance-frame, a shiftable coin-positioning member normally extending in coin-receptive position from said frame, coin-feeding means including a coin-engaging member shiftable toward said frame and adapted for coin-holding cooperation with said positioning member for coin-depositing retraction thereof on said frame, means for reciprocably actuating said coin feeding means, and other means carried by said actuating means for extending said positioning member in coin-receptive position on reverse actuation of said coin-feeding means.

11. Coin-selecting apparatus comprising, in combination a coin-weighing balance-frame, means for depositing a coin on said frame, an arm mounted on said frame for oscillation therewith, a swingable coin-distributing valve, and a normally open electrically operating circuit for the valve including a first movable contact-member mounted on the swingable end of said arm, a second movable contact member, and means for actuating said second contact-member for movement intersecting the path of said first contact member, said second contact member being adapted for cooperative circuit-closing engagement with said first contact-member on coin-weighing actuation of said frame responsively to deposit thereon of a coin of predetermined weight.

12. Coin-selecting apparatus including, in combination, mechanism comprising a balance for gauging the weight of a coin, mechanism comprising coin-engaging members mounted on said balance for coincidentally gauging the thickness of said coin, means for feeding a coin to said balance, an electric circuit comprising closing contacts associated with the gauging means and an electro-magnet operable responsively to circuit closing engagement of said contacts, and coin distributing means electrically operable on closing of the circuit responsively to coin-gauging operation of said balance and its carried thickness gauges.

13. In a coin-selecting apparatus, coin-gauging means, in combination with coin-distributing mechanism including a coin-distributing valve, a coin-rejecting cam, a coin-accepting cam, a cam-follower shiftable for alternate engagement with said cams, means adapted for normally shifting said follower into engagement with said coin-rejecting cam, coin-responsive means adapted on cooperation of said gauging means with an acceptable coin for shifting said follower into engagement with said coin-accepting cam, and means cooperating with said follower on cam-actuated operation thereof for actuating said valve in corresponding coin-distributing direction.

14. In a coin-selecting apparatus, coin-gauging means, in combination with a coin-chute adapted for receiving coins from said gauging means, an oscillatory valve normally closing an end of said chute, a vibratory lever having operative connection with said valve for tilting actuation thereof in alternative coin-distributing directions, cam-means for actuating said lever in coin-rejecting direction, other cam-means for actuating said lever in coin-accepting direction, and cam-follower means cooperating with said lever adapted for engagement alternatively with said respective cams for corresponding actuation of said coin-distributing valve.

15. In a coin-selecting apparatus, coin-gauging means, in combination with a coin-chute for receiving coins from said gauging means, an oscillatory valve normally closing an end of said chute, a vibratory lever having operative connection with said valve for tilting actuation thereof in alternative coin-distributing directions, cam-means for actuating said lever in coin-rejecting direction, other cam-means for actuating said lever in coin-accepting direction, cam-follower means cooperating with said lever for engagement alternatively with said respective cams for corresponding actuation of said coin-distributing valve, and coin-selecting means actuable responsively to said coin-gauging means for selectively shifting said follower for engagement thereof with said coin-accepting cam.

16. In a coin-selecting apparatus, coin-gauging means, in combination with coin-distributing mechanism including a coin-distributing valve, a coin-rejecting cam, a coin-accepting cam, a cam-follower shiftable for alternate engagement with said cams, means for normally shifting said follower into engagement with said coin-rejecting cam, coin-responsive means for, on cooperation of said gauging means with an acceptable coin, shifting said follower into engagement with said coin-accepting cam, means cooperating with said follower for actuating said valve in corresopnding coin-distributing direction, a rotary drum having said cams axially aligned respectively at the opposite ends thereof, said follower having a pair of projecting diametrically opposed cam-embracing jaws for engaging said drum in neutral position intermediate said cams, means carried by said drum for normally guiding said follower from neutral position into engagement with said coin-rejecting cam, and coin-responsive means adapted for shifting said follower into engagement with said coin-accepting cam.

17. Coin-selecting apparatus comprising coin-engaging means, in combination with coin-distributing means including a shiftable valve, a rotary cam, and a substantially C-shaped follower partially embracing the cam and pivotally swingable for co-operation with the cam responsively to operation of the gauging means for corresponding actuation of the valve.

18. Coin-selecting apparatus comprising coin-gauging means, in combination with coin-distributing means including a shiftable valve, a rotary cam, a substantially C-shaped follower partially embracing the cam, and mechanism for swinging the follower for co-operation with the cam responsively to operation of the gauging means for corresponding actuation of the valve.

19. Coin-selecting apparatus comprising coin-gauging means including an electric circuit, in combination with coin-distributing means including a shiftable valve, a cam, and a follower shiftably co-operable with the cam responsively to the condition of said circuit for actuation of the valve.

20. Coin-selecting apparatus comprising, in combination, mechanism including coin-dimensional gauging means and a normally open electric circuit associated with said means, the circuit being closed through said means on acceptance thereby of a particular coin, coin-distributing means including a shiftable valve, a cam, and a shiftable follower normally disposed with relation to the cam for coin-rejecting actuation of the valve, and mechanism responsive to closing of the circuit for shifting the follower on the cam for actuating the valve for accepting the particular coin.

21. Coin-selecting-apparatus comprising in combination, means including an oscillatory balance-frame for receiving a deposited coin for gauging the weight thereof, a chute in fixed relation to the frame for receiving coins discharged therefrom, a coin-distributing valve oscillatory with relation to the chute, and means magnetically operable for oscillating the valve for accepting only coins of a predetermined weight and for rejecting coins of a weight both over and under said predetermined weight.

22. Coin-selecting apparatus comprising means for gauging the weight of a coin, said means including a normally open electric circuit automatically closed on acceptance by the gauging means of a coin of predetermined weight, in combination with coin-distributing means actuable responsive to open condition of the circuit for rejecting coins of a weight both over and under said predetermined weight and actuable on closing of the circuit for accepting the coin of predetermined weight.

23. Coin-selecting apparatus comprising, in combination, coin-gauging means, a normally open electric circuit including a first contact-member associated with the gauging means, and coin-distributing means actuable responsive to said circuit for normally rejecting coins of a weight both over and under a predetermined intermediate acceptable weight, said contact-member being shiftable with the gauging means from or to coin overweight to or from coin underweight positions, the distributing means comprising a second contact-member engageable with the first contact-member on intermediate coin-accepting position of the gauging means for closing the circuit for actuation of the distributing means for accepting the particular coin.

24. Coin-selecting apparatus comprising, in combination, coin-weighing means including a balance-frame, and mechanism including shiftable members co-operably approachable in approximately the same horizontal plane for depositing successive coins on the balance-frame.

25. Coin-selecting apparatus comprising coin-gauging means, in combination with mechanism for feeding coins to the gauging means, said mechanism including notched members co-operably approachable for opposingly holding the coin, and stops co-operating therewith for positioning the coin on the coin-gauging means.

26. Coin-selecting apparatus comprising, in combination, coin-gauging means including a coin-supporting-member, and mechanism including shiftable members co-operably approachable in approximately the same horizontal plane for depositing successive coins flatwise on said supporting-member, one of said members being also operable for shifting the successive coins from the supporting-member.

27. Coin-selecting-apparatus comprising coin gauging means, in combination with coin feeding mechanism, said mechanism comprising coin-supporting means for receiving a deposited coin, a coin shifting member normally in spaced relation from the gauging means, said member being movable over said supporting means and said member and said supporting means being shiftable toward the gauging means for disposing the deposited coin on the gauging means, and means for retracting the coin supporting means upon deposit of the coin upon the gauging means.

28. Coin-selecting-apparatus comprising coin gauging means, in combination with coin feeding mechanism, said mechanism comprising coin-supporting means for receiving a deposited coin, a coin shifting member normally in spaced relation from the gauging means, said member being movable over said supporting means and said member and said supporting means being shiftable toward the gauging means for disposing the deposited coin on the gauging means, and means for retracting the coin supporting means and the coin shifting member to normal position upon deposit of the coin upon the gauging means.

29. Coin-selecting-apparatus comprising, in combination, a balance-frame for coin-weighing oscillation, and mechanism including a coin-shifting member engageable with the frame for holding said frame in non-operative non-oscillatory position during feeding movement of a coin thereupon.

30. Coin-selecting apparatus comprising, in combination, a balance-frame for coin-weighing oscillation, means including a coin-shifting member for feeding a coin upon the frame, and means on the balance-frame engageable with the coin shifting member for holding the balance-frame in non-oscillatory position for reception of a coin from the coin-shifting member.

31. Coin-selecting apparatus comprising mechanism for gauging the thickness of a coin, said mechanism including a support for a deposited coin, and a lever pivotally carried by the support for rockable movement and biased for engagement with the deposited coin, in combination with a normally open electric circuit including co-operable contacts on the lever and support for closing the circuit on engagement of the lever with a coin of more than predetermined minimum thickness.

32. Coin-selecting apparatus comprising mechanism for guaging the thickness of a coin, said mechanism comprising a member for flatwise supporting a deposited coin and an oscillatory lever mounted for engagement with the deposited coin, in combination with a normally closed electric circuit including co-operable contacts on the lever and member, said contacts being spaced for opening the circuit on engagement of the lever with a coin of greater than predetermind maximum thickness.

33. Coin-selecting apparatus including, in combination with a normally open electric circuit including co-operable normally spaced contacts, coin gauging mechanism comprising a coin-supporting member, and a contact-actuating lever swingable on and over the supporting-member for coin-gauging co-operation with the supporting member, said lever closing the circuit through said contacts on acceptably gauging a minimum dimension of a deposited coin at a predetermined point thereof.

34. Coin-selecting apparatus including, in combination with normally open electric circuit including co-operable normally spaced contacts, coin gauging mechanism comprising a support for a deposited coin, and a contact-actuating lever pivotally carried by the support for rockable movement and biased for engagement at an end with a deposited coin, said lever closing the circuit through said contacts on acceptably gauging a maximum dimension of a deposited coin at a predetermined point thereof.

35. Coin-selecting apparatus including, in combination with a normally open electric circuit including a plurality of electrically interconnected contacts, coin-gauging mechanism comprising a coin-supporting member, a plurality of contact-actuating levers swingably supported for coin-gauging co-operation with the supporting-member for closing the circuit through said contacts on acceptably gauging a maximum dimension of a deposited coin at a predetermined point thereof and co-incidently a minimum dimension of the coin at another point thereof.

36. Coin-selecting apparatus including, in combination with a normally open electric circuit including a plurality of electrically interconnected contacts, a coin-supporting member, a plurality of coin-gauging contact-actuating levers for yieldingly engaging a coin deposited on the supporting-member, and means for depositing a coin on the supporting-member between the same and the levers, the levers being yieldingly shiftable on and by the coin being deposited and closing the circuit through said contacts on acceptably gauging a maximum dimension of a deposited coin at a predetermined point thereof and co-incidently a minimum dimension of the coin at another point thereof.

37. Coin-selecting apparatus including, in combination, coin distributing means, and electrically operable mechanism depending for its operation upon differences both in the weight and thickness of a deposited coin for governing the actuation of said means.

38. Coin-selecting apparatus including in combination, a coin-weighing balance-frame operable from non-weighing to weighing position, mechanism for feeding coins to the frame, mechanism for distributing coins from the frame, and electrically operable mechanism including a motor for actuating said feeding and distributing mechanisms and the frame in cyclic relation.

39. Coin-selecting apparatus including in combination a coin-weighing balance-frame operable from non-weighing to weighing position, mechanism for feeding coins to the frame, mechanism for distributing coins from the frame, and electrically operable mechanism for actuating the feeding and distributing mechanism and frame in cyclic relation, said actuating mechanism including a normally open main electric circuit, a motor in said circuit, a branch-loop circuit having conducting members for electrical connection by a deposited coin for initiating motor actuation, and a switch automatically operable on initial motor-actuation for closing the main circuit.

40. Coin-selecting apparatus including coin-gauging means, in combination with mechanism including a pair of insulatably spaced conducting members longitudinally shiftable for depositing the successive coins into the gauging means, mechanism for distributing the successive coins from the gauging means, and electrically operable mechanism for actuating the feeding and distributing mechanisms in cyclic relation, the actuating mechanism including a normally open main electric circuit, a motor in said circuit, a branch loop-circuit, said conducting members being comprised in the loop-circuit for electrical connection by a coin disposed thereon in spanning relation for initiating motor actuation, and a switch automatically operable on initial motor-actuation for closing the main circuit, the loop-circuit being ruptured upon deposit of the coin into the gauging means.

41. Coin-selecting apparatus including, in combination with an electrical circuit, a coin-weighing frame having circuit-included parts contactively responsive to acceptable coin-weight, and means for retaining the coin on the frame for coin-weighing purposes, said means comprising coin-shiftable members included in the circuit for yieldingly engaging the coin for coincidently gauging the thickness thereof during the coin-weighing operation.

42. Coin-selecting apparatus including, in combination, coin-gauging means, and mechanism for feeding coins to the gauging means, said mechanism including a reciprocable frame, and means comprising a cam-actuated vibratory lever having operative connection at an end with said frame for shiftable actuation thereof, said connection being yieldable in coin-feeding direction.

43. Coin-selecting apparatus comprising coin-gauging means, in combination with coin-distributing means including a shiftable valve, a cam, a shiftable follower co-operable with the cam, and mechanism for shifting the follower on the cam responsively to operation of the gauging means for corresponding actuation of the valve, and mechanism including members electrically actuable responsive to follower actuation for visually indicating the coin-accepting or rejecting actuation of the gauging means.

44. In a coin-selecting apparatus, in combination, coin-gauging means, coin-distributing means responsive to actuation of the coin-gauging means, a pair of signal circuits, a double-throw switch normally disposed for closing one signal circuit, means responsive to coin-accepting actuation of the distributing means for shifting the switch for closing the other signal circuit, and means for energizing the switch closed-circuit during a stated interval of operation of the apparatus for correspondingly indicating the rejection or acceptance of a coin.

45. Coin-selecting apparatus comprising, in combination, means for simultaneously gauging the weight and thickness of a coin, coin-distributing means, and electrically operable mechanism for actuating the distributing means during the gauging of the coin.

46. Coin-selecting apparatus comprising, in combination, means for simultaneously gauging the thickness and weight of a coin, a normally open electrical circuit associated with said means, coin distributing means actuable on closing of said circuit, and mechanism for closing the circuit on gauging acceptance of a particular coin by the gauging means.

47. Coin-selecting apparatus comprising in combination, a coin-support, and electrical switching mechanism co-operable with the support for both gauging the weight and thickness of the coin while the coin is in a particular position on the support.

48. Coin weighing apparatus comprising a coin-weighing balance frame, means for feeding a coin to the balance-frame including a slide, means on the slide for controlling the operation of the balance-frame, and means for actuating the slide in a continuous movement in one direction for feeding a coin to the balance frame and in an interrupted movement in reverse direction for permitting intervening actuation of the balance frame.

49. Coin-selecting apparatus comprising mechanism for gauging the thickness of a coin, said mechanism including a coin-supporting member and an oscillatory lever biased for movement over said member for engaging at an end with the coin, in combination with a normally open electrical circuit including switching contacts on the lever and member actuable to circuit-closing position on engagement of the lever with a coin of more than predetermined thickness, and means for energizing the circuit at a stated interval of operation of the apparatus.

50. Coin-selecting apparatus comprising, in combination, a member for horizontally supporting a coin, means including a plurality of co-operable members slidably shiftable on approximately the same plane for depositing a coin horizontally on, and subsequently discharging the same from, the support, and means comprising a lever mounted on the support for rockable movement over and substantially at right angles to the face of the deposited coin for opposingly co-operating with the support for gauging the deposited coin as to thickness.

51. Coin-selecting apparatus comprising, in combination, a member for horizontally supporting a coin, means including a plurality of co-operable members slidably shiftable on approximately the same plane for depositing a coin horizontally on, and subsequently discharging the same from, the support, and means comprising a plurality of levers mounted on the support for rockable movement over and substantially at right angles to selected portions of the face of the deposited coin for opposingly co-operating with the support for gauging the marginal and central thickness of the deposited coin.

52. In a fraud preventive device for check controlled apparatus, a selector mechanism including a balancing frame, means for guiding a check to said balancing frame, means co-operable with the balancing frame for measuring the thickness of a check deposited on the frame, and means electrically controlled by said balancing frame and by said thickness measuring means associated with said balancing frame for determining the disposition of the check after leaving the balancing frame.

53. Coin-selecting apparatus comprising, in combination, coin-dimensional and coin-feeding gauging means including a balance-frame, biased coin-engaging members co-operable with the frame, and an electrical circuit associated therewith, coin-distributing means for receiving coins from the gauging means, and mechanism for actuating the distributing means responsively to current flow in said circuit for accepting a particular coin on gauging acceptance thereof by the gauging means.

54. Coin-selecting apparatus comprising, in combination, coin-distributing means including a shiftable valve, a normally open electrical circuit including means for actuating the valve for accepting only a coin of a predetermined weight and thickness, and means including an oscillatory balance-frame and coin-engaging members co-operable with the frame for closing said circuit upon gauging a coin having such predetermined weight and thickness.

55. Coin-selecting apparatus comprising, in combination, a frame for horizontally supporting a coin, spaced brackets upstanding from the frame, a shaft supported by said brackets, a lever pivotally mounted intermediate its ends on the shaft for swingable movement over the frame for coin-dimensional gauging co-operation at an end-portion with the frame, and means engaging the other end-portion of the lever for yieldingly biasing the lever at its first end-portion toward the frame.

56. Coin-selecting apparatus comprising, in combination, a frame for horizontally supporting a coin, spaced brackets upstanding from the frame, a shaft supported by said brackets, levers each pivotally mounted intermediate its ends on the shaft for swingable movement over the frame, a plurality of fingers carried by the levers at an end-portion thereof for endwise coin-dimensional gauging co-operation with the frame, and spring-means engaging the levers at their respective other end-portions for yieldingly biasing the respective first end-portions thereof toward the frame.

57. Coin-selecting apparatus including, in combination, mechanism comprising an oscillatory balance-frame for horizontally supporting a deposited coin for gauging the weight thereof, means comprising a plurality of members mounted on and shiftable relatively to the balance-frame for endwise co-operation with the balance-frame in simultaneously gauging the thickness of the deposited coin, and means for slidably interposing the coin intermediate said members and the frame.

58. Coin-selecting apparatus comprising, in combination, a coin-weighing oscillatory balance frame for horizontally supporting a deposited coin, means including a spring-biased member shiftable over and relatively to the frame by the deposited coin for engaging the same on the frame in coin-thickness-gauging co-operation therewith, and means for slidably depositing the coin intermediate the frame and said member.

59. Coin-selecting apparatus including, in combination, coin-gauging means, and mechanism for feeding the coins to the gauging-means, said mechanism including a reciprocable frame, a pivoted lever intermediately apertured for providing a ring cam, and a rotative member engaging the cam for intermittently shifting the frame at predetermined intervals.

60. Coin-selecting apparatus including, in combination, coin-gauging mechanism, a normally open electric circuit including a pair of spaced plungers for closing the circuit on deposit of a coin thereon, said plungers being slidably actuable for feeding the deposited coin to said mechanism, and means including a motor comprised in said circuit for actuating the plungers on closing of the circuit.

GEORGE McD. JOHNS.